United States Patent [19]

Howden

[11] Patent Number: 4,615,847

[45] Date of Patent: Oct. 7, 1986

[54] METHOD AND APPARATUS FOR PRODUCING A LENS HAVING AN ACCURATELY CENTERED ASPHERICAL SURFACE

[75] Inventor: Harry Howden, Smallfield, England

[73] Assignee: U.S. Philips Corporation, New York, N.Y.

[21] Appl. No.: 705,757

[22] Filed: Feb. 25, 1985

[30] Foreign Application Priority Data

Mar. 9, 1984 [GB] United Kingdom ................ 8406159

[51] Int. Cl.[4] ............................................. B29D 11/00
[52] U.S. Cl. ..................................... 264/1.7; 249/91;
  264/1.4; 264/2.1; 264/2.7; 425/125; 425/127;
  425/171; 425/172
[58] Field of Search ................... 264/1.1, 1.2, 1.3, 1.4,
  264/1.7, 1.8, 1.9, 2.1, 2.7, 22, 40.2; 425/808,
  117, 125, 127, 171, 172; 249/91

[56] References Cited

U.S. PATENT DOCUMENTS

| | | | |
|---|---|---|---|
| 2,266,169 | 12/1941 | Crimnine | 264/1.1 |
| 2,332,674 | 10/1943 | Smith | 425/808 |
| 2,532,501 | 12/1950 | Johnson | 18/17 |
| 3,174,391 | 3/1965 | Papke | 264/1.9 |
| 3,237,204 | 3/1966 | Honsaker | 2/13 |
| 3,273,204 | 9/1966 | Craddock | 425/808 |
| 4,246,207 | 1/1981 | Spycher | 425/808 |
| 4,440,699 | 4/1984 | Smid et al. | 264/1.4 |

FOREIGN PATENT DOCUMENTS

| | | |
|---|---|---|
| 0051027 | 5/1982 | European Pat. Off. |
| 1172417 | 6/1964 | Fed. Rep. of Germany |
| 1366981 | 9/1974 | United Kingdom |
| 1395203 | 5/1975 | United Kingdom |

Primary Examiner—James Lowe
Attorney, Agent, or Firm—Marc D. Schechter

[57] ABSTRACT

A lens is produced having one aspherical surface which is accurately axially aligned with a spherical or flat surface on the opposite side of the lens. The aspherical surface is produced with a mold. The mold has a molding surface having an accurate negative profile and the desired finish of the required aspherical surface.

The mold is on a rotatable jig. By means of adjustment screws the mold is adjusted to correct misalignment of the axis of the molding surface and the axis of rotation of the jig. Misalignment is detected by directing a collimated light beam onto the molding surface so that it is reflected onto a screen. When the mold is rotated, the light beam moves on the screen until the molding surface is properly aligned with the axis of rotation.

A preformed glass substrate has one aspherical surface of approximately the desired profile and finish and on its opposite side a spherical or flat surface. The substrate is then mounted on the jig with its aspherical surface facing and spaced from the molding surface. By means of further adjustment screws, the substrate is adjusted to correct misalignment of the axis of the spherical or flat surface of the substrate and the rotational axis of the jig. This misalignment also is detected with the collimated light beam and the screen.

The gap between the substrate and the mold is then filled with a suitable liquid light transmissive polymeric material. The polymer is allowed to harden and form a molded layer bonded on one side to the substrate. The other side forms an aspherical surface of the required profile and optical finish, axially aligned with the spherical or flat surface of the substrate.

6 Claims, 4 Drawing Figures

METHOD AND APPARATUS FOR PRODUCING A LENS HAVING AN ACCURATELY CENTERED ASPHERICAL SURFACE

BACKGROUND OF THE INVENTION

The invention relates to a method of producing a lens having one accurately centered aspherical surface. An accurately centered, aspherical surface is one which is axially aligned with respect to a nonaspherical surface on the opposite side of the element. Each each surface of the lens is a surface of revolution. The nonaspherical surface may be spherical or flat.

Until recently, the formation of aspherical surfaces on optical elements by replication has been limited to elements which require only a fairly low degree of accuracy in the centering of the aspherical. Such optical elements include, for example, Schmidt corrector plates. The use of replication techniques is now being extended to more critical optical elements, such as lenses for projection T.V. systems, which demand a much greater centering accuracy.

SUMMARY OF THE INVENTION

It is an object of the present invention to center an aspherical surface on a lens with increased accuracy.

According to the invention, a glass substrate is provided as the starting material. An aspherical surface, of approximately the desired profile and finish of the required aspherical surface is provided on one side of the substrate. A nonaspherical surface is provided on the opposite side of the substrate. The method also uses a mold. The mold has a molding surface having an accurate negative profile. The surface profile is a negative of the required aspherical surface of the finished lens. The molding surface also has the desired optical finish of the final aspherical.

According to the invention, the mold is mounted on a rotatable jig. By rotating the mold by means of the jig, misalignment of the axis of the molding surface and the axis of rotation of the jig can be detected. The mold can be adjusted on the jig to correct such misalignment.

The mould is then secured in this position on the jig, and the preformed substrate is mounted on the jig with the aspherical surface of the substrate facing and spaced from the molding surface of the mold. By rotating the substrate by means of the jig, misalignment of the axis of the nonaspherical surface of the substrate and the rotational axis of the jig and can be detected. The substrate can then be adjusted on the jig to correct such misalignment, and to position the substrate on the jig with the distance between the non-aspherical surface and the molding surface (measured along the aligned axes of these surfaces) equal to the desired axial thickness of the finished lens. The space between the aspherical surface of the substrate and the molding surface is then filled with a liquid light-transmissive polymeric material. This material is bonded to the aspherical surface of the substrate while molding the material to form the required aspherical surface. Finally, the substrate, with the molded layer of polymeric material bonded thereto, is separated from the molding surface.

The positions of the mold and the substrate may each be adjusted translationally in directions transverse to the axis of rotation of the jig, and/or rotationally about an axis or axes perpendicular to the axis of rotation of the jig. The position of the substrate may also be adjusted axially relative to the mold.

Prior to separation of the substrate from the mold, the edge of the substrate may be ground to give the finished lens an edge which is concentric with the aligned axes of the aspherical and nonaspherical surfaces of the lens. This ensures that the lens as a whole will be accurately centered with respect to the mount in which it is subsequently fitted.

The invention also provides an apparatus for performing the method according to the invention. The apparatus comprises a rotatable jig for supporting the mold and the preformed substrate. On rotation of the mold and rotation of the substrate, means are provided to detect misalignment of the axis of the molding surface of the mold and the axis of rotation of the jig, and misalignment of the axis of the nonaspherical surface of the substrate and the axis of rotation of the jig. Means are also provided for adjusting the position of the mold on the jig to correct misalignment of the axis of the molding surface and the rotational axis of the jig, and for securing the mold in a position on the jig in which these two axes are accurately aligned with each other. Means are provided for the position of adjusting the substrate on the jig to correct misalignment of the axis of the nonaspherical surface of the substrate and the rotational axis of the jig, for positioning the substrate on the jig with these two axes accurately aligned with each other, and for adjusting the axial position of the substrate relative to the mold to set the distance between the nonaspherical surface and the molding surface, measured along the aligned axis of these surfaces, to a desired value.

The means for adjusting the position of the mold, and the means for the position of the substrate may comprise screw threaded adjusting devices on the jig. The adjusting devices are arranged for adjusting the mold and the substrate translationally in directions transverse to the axis of rotation of the jig, and rotationally about axes perpendicular to the axis of rotation of the jig, and for adjusting the substrate axially relative to the mold.

DESCRIPTION OF THE PREFERRED EMBODIMENTS

Figure 1:
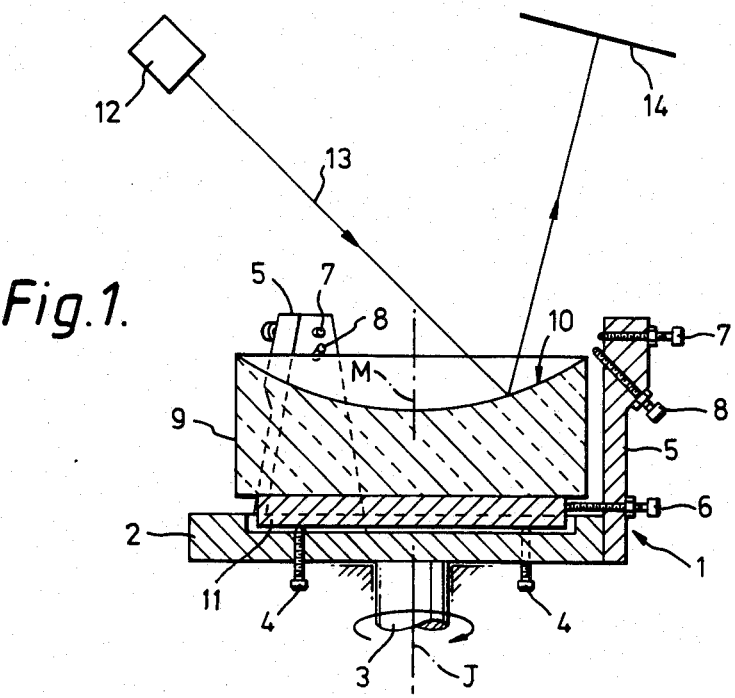
FIG. 1 is an axial sectional view of the jig with a mold mounted on it, illustrating schematically the detection of axial misalignment of the mold and the jig.
Figure 2:
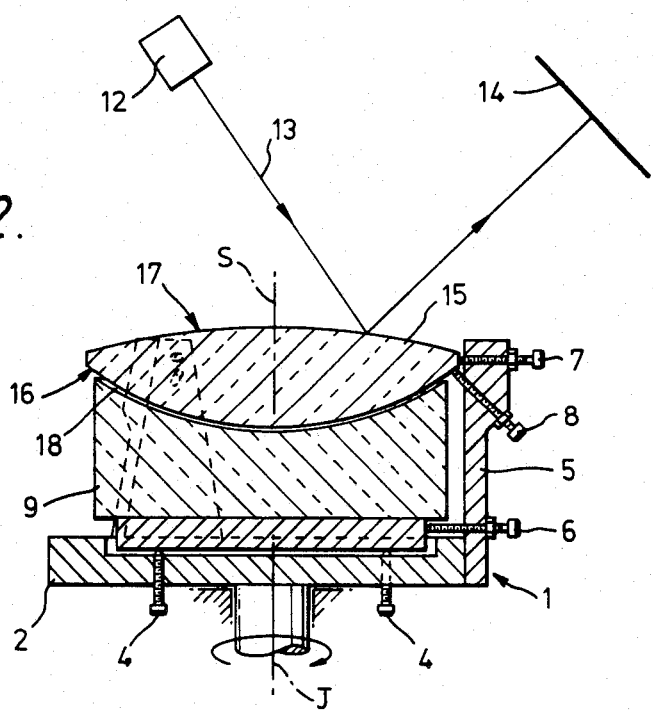
FIG. 2 is a view similar to FIG. 1 showing a preformed substrate mounted on the jig above the mold, and illustrating the detection of axial misalignment of the substrate and the jig.
Figure 3:
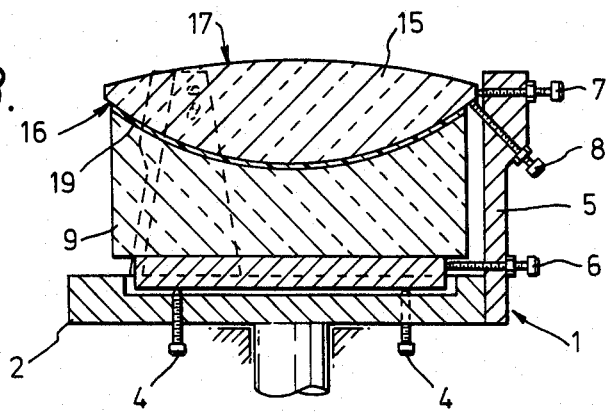
FIG. 3 is another axial sectional view showing the gap between the substrate and the mold filled with polymeric material.

The jig 1 shown in FIGS. 1, 2, and 3 is rotatable for rotation about a vertical axis J. Jig 1 comprises a generally circular horizontal base plate 2 fixed on a vertical shaft 3. Shaft 3 is arranged to be driven by an electric motor (not shown).

Extending parallel to the axis J through screw threaded bores in the base plate 1 are three or more adjustment screws 4. Screws 4 are equally spaced about the axis of the shaft 3, which is the axis J of rotation of the jig 1. In the present embodiment there are three of these adjustment screws in the base plate.

Projecting upward from the base plate 2 at the periphery thereof are three posts 5. Posts 5 are spaced equally around the periphery of the base plate 2. There may be more than three of these posts if desired.

In the lower part of each post 5 is an adjustment screw 6. Each screw 6 extends radially with respect to the axis of rotation J of the jig 1 through a screw threaded bore in the post 5. In the upper part of each post 5 are an adjustment screw 7 and an adjustment screw 8. Screw 7 also extends radially with respect to the axis of rotation J of the jig 1 through a screw threaded bore in the post 5. Below the screw 7, adjustment screw 8 extends through a bore which is inclined upward from the outer side of the post to the inner side.

FIG. 1 shows a mold 9 mounted on the jig 1. The mold 9 consists of a cylindrical glass block provided on one side with a molding surface 10. Surface 10 has a profile which is an accurate negative of the required aspherical surface for the lens to be produced. The aspherical surface is a surface of revolution. In the present example this aspherical surface is a convex surface, and the molding surface 10 therefore a concave surface.

The molding surface 10 is formed by hand cutting and polishing to the desired profile accuracy and to the desired optical finish of the aspherical surface of the lens. On the side remote from the molding surface 10, the mold 9 is flat. To mount the mold 9 on the jig 1, the mold 9 is secured at this flat side, for example by waxing, to a circular steel plate 11. Plate 11 is then placed on the tips of the adjustment screws 4 on the base plate 2 of the jig 1 so as to be level with the radial adjustment screws 6 in the lower parts of the posts 5 of the jig. The mold 9 is roughly centered by eye on the jig 1, and the adjustment screws 6 are turned to bring their inner ends into engagement with the edge of the plate 11.

The mold 9 must now be accurately centered on the jig 1. That is, the axis M of the molding surface 10 (i.e., the axis about which this surface of revolution is generated) must be accurately aligned with the axis of rotation J of the jig. This alignment is performed with the aid of means for detecting misalignment of the two axes.

The alignment detecting means may be of a known type used in centering a lens element having a spherical surface on both sides. In the present embodiment, the means comprises a light source 12. Light source 12 directs a collimated light beam 13 onto the molding surface 10 at a point spaced from the axis M of this surface. The beam is reflected by the molding surface 10 onto a screen 14. The molding 9 is rotated by means of the jig and if, as is likely, of the axis M of the molding surface 10 is not aligned with the rotational axis J of the jig, the spot of reflected light on the screen 14 will move as the mold rotates. The position of the mold is then adjusted as necessary on the jig by the adjustment screws 4 and/or the adjustment screws 6 until the light spot remains motionless on the screen. This indicates that the two axes M and J are accurately aligned with each other.

The position of the mold is adjustable rotationally about axes perpendicular to the axis J of the jig by the vertical adjustment screws 4. The position of the mold is adjustable translationally in directions perpendicular to the axis J by the radial adjustment screws 6. When the adjustment has been completed the screws 6 are tightened to clamp the mold in the centered position on the jig 1.

FIG. 2 shows a preformed glass substrate 15 mounted on the jig 1 above the mold tool 9. The substrate 15 is produced in known manner. On one side it has an aspherical surface 16 of approximately the desired profile and finish of the required aspherical surface on the lens to be produced. The surface 16 is formed in known manner by a conventional inexpensive production technique, for example molding, machining and/or grinding. On the opposite side, the substrate 15 is provided with a spherical surface 17, which is also formed in known manner by conventional grinding and polishing techniques. The surface 17 is a surface of revolution generated about an axis S.

The substrate 15 has a diameter slightly larger than that of the mold 9 so that when the substrate 15 is placed on the jig 1 above the mold 9, a peripheral portion of the substrate 15 projects beyond the periphery of the mold. The peripheral extension of substrate 15 rests on the tips of the upwardly inclined adjustment screws 8 on the jig, as shown in FIG. 2.

The substrate 15 is initially mounted in a roughly centered position on the screws 8, with its aspherical surface 16 facing the molding surface 10 of the mold 9. Surface 16 is and spaced from surface 10 by a gap 18. The upper radial adjustment screws 7 in the posts 5 of the jig 1 are then turned to bring their inner ends into engagement with the edge of the substrate 15.

The substrate 15 is then centered accurately on the jig 1 in a similar manner to that in which the mold 9 was centered. Thus, the beam 13 from the light source 12 is reflected by the spherical surface 17 of the substrate 15 onto the screen 14 while the substrate 15 is rotated by means of the jig. Misalignment of the axis S of the surface 17 and the axis of rotation J of the jig can be detected, and by means of the adjustment screws 7 and 8 the misalignment can be corrected.

The position of the substrate is adjusted substrate is adjustable translationally in directions transverse to the axis J of the jig by means of the radial adjustment screws 7. The position of the substrate is adjusted rotationally about axes perpendicular to the axis J by means of the inclined adjustment screws 8. When the axis S of the spherical surface 17 of the substrate is accurately aligned with the axis J of the jig, it is ipso facto accurately aligned with the axis M of the molding surface 10 of the mold 9.

The position of the substrate is also adjustable axially relative to the mold 9 by means of the inclined adjustment screws 8. The position of the substrate is adjusted to set the distance between the spherical surface 17 of the substrate and the molding surface 10 of the mold, measured along the aligned axes of these surfaces, to the desired axial thickness of the finished lens. When the position of the substrate has been adjusted, the radial adjustment screws 7 are tigtened to clamp the substrate in position on the jig 1.

The actual process of replicating the required aspherical surface can now be performed. This is a known process and need not be described in detail. It consists of filling the gap 18 between the aspherical surface 16 of the substrate 15 and the molding surface 10 of the mold 9 with a suitable light-transmissive polymeric material in liquid form, as shown at 19 in FIG. 3. The material is then allowed to harden to form a mold layer 19 which on one side is bonded to the relatively inaccurate aspherical surface 16 of the substrate 15, and on the other side forms an aspherical surface of the desired profile accuracy and optical finish (reproduced from the molding surface 10 of the mold). If desired, before mounting the substrate on the jig the aspherical surface 16 of the substrate may be treated with a bond promoting agent.

The substrate 15, with the molded layer 19 bonded to it, is subsequently separated from the mold 9. But before it is separated, the edge of the substrate is ground down to the required diameter of the finished lens. This also gives the lens an edge which is truly concentric with the aligned axes of the spherical and aspherical surfaces of the lens as a result, the lens as a whole will be accurately centered with respect to the mount in which it is subsequently fitted.

Figure 4:
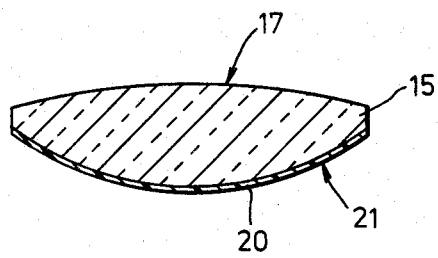
FIG. 4 is an axial sectional view of the finished lens element after separation from the mold.

The finished lens is shown in FIG. 4. The molded layer is designated 20, and the aspherical surface formed by the layer is designated 21.

Separation of the molded layer 20 from the molding surface 10 of the mold 9 may be assisted by treating the latter surface with a release agent prior to mounting the mold on the jig 1. The same mold may, of course, be used repeatedly to produce a large number of lenses.

In the above example, the method according to the invention is used to produce a lens having a convex aspherical surface. The method may also be used to produce a lens having a concave aspherical surface.

Instead of a collimated light beam, a laser beam may be used in the means for detecting misalignment of the axes of the molding surface of the mold and the aspherical surface of the substrate and the axis of rotation of the jig. Other known means may alternatively be used for this purpose; for example. For an electrically sensitive stylus or a stylus coupled to a mechanical clock gauge.

I claim:

1. A method of manufacturing a lens having one aspherical surface and one nonaspherical surface arranged opposite the aspherical surface, both surfaces being aligned on a lens axis and being rotationally symmetric about the lens axis, said method comprising the steps of:

providing a mold, said mold having an aspherical mold surface which is the negative of the desired aspherical lens surface, said aspherical mold surface having an axis of rotational symmetry and having an optical finish which is the same as the optical finish of the desired aspherical lens surface;

mounting the mold on a jig;

rotating the mold on a jig around an axis of rotation;

reflecting a beam of light off of the aspherical mold surface to form a light spot on a screen;

adjusting the position of the mold until the light spot no longer moves on the screen when the mold is rotated on the jig;

providing a glass substrate having first and second surfaces on opposite sides of the substrate, the first surface having approximately the asphericity and finish of the desired aspherical surface, the second surface forming the nonaspherical surface of the finished lens;

mounting the substrate on the jig with the aspherical substrate surface facing and spaced from the aspherical mold surface;

rotating the substrate on the jig around the axis of rotation;

reflecting a beam of light off of the nonaspherical substrate surface to form a light spot on the screen;

adjusting the position of the substrate until the light spot no longer moves on the screen when the substrate is rotated on the jig;

filling the space between the mold and the substrate with a liquid light-transmission polymeric material;

bonding the polymeric material to the aspherical surface of the substrate; and removing the mold.

2. A method as claimed in claim 1, characterized in that:

the position of the mold is adjusted in directions transverse to the rotation axis and in directions around axes perpendicular to the rotation axis; and the position of the substrate is adjusted in a direction along the rotation axis, directions transverse to the rotation axis, and in directions around axes perpendicular to the rotation axis.

3. A method as claimed in claim 2, characterized in that the substrate has an edge, and the method further comprises the step of grinding the edge of the substrate while it is rotating on the jig to make the edge concentric with the rotation axis.

4. A method as claimed in claim 1, characterized in that the substrate has an edge, and the method further comprises the step of grinding the edge of the substrate while it is rotating on the jig to make the edge concentric with the rotation axis.

5. An apparatus for manufacturing a lens having one aspherical surface and one nonaspherical surface arranged opposite the aspherical surface, both surfaces being aligned on a lens axis and being rotationally symmetrical about the lens axis, said apparatus comprising:

a jig for rotating a mold and a substrate about an axis of rotation, said mold having an aspherical mold surface which is the negative of the desired aspherical lens surface, said aspherical mold surface having an axis of rotational symmetry and having an optical finish which is the same as the optical finish of the desired aspherical lens surface, said substrate having first and second surfaces on opposite sides of the substrate, the first surface having approximately the asphericity and finish of the desired aspherical surface, the second surface forming the nonaspherical surface of the finished lens;

a light source and screen for reflecting a beam of light off of the aspherical mold surface or the nonaspherical substrate surface to form a light spot on the screen;

means for adjusting the position of the mold until the light spot no longer moves on the screen when the mold is rotated on the jig; and means for adjusting the position of the substrate until the light spot no longer moves on the screen when the substrate is rotated on the jig.

6. An apparatus as claimed in claim 5, characterized in that the means for adjusting the position of the mold and the means for the adjusting the position of the substrate comprise adjusting screws on the jig.

* * * * *